(12) United States Patent
Kuno et al.

(10) Patent No.: US 8,095,959 B2
(45) Date of Patent: Jan. 10, 2012

(54) METHOD AND SYSTEM FOR INTEGRATING POLICIES ACROSS SYSTEMS

(75) Inventors: Harumi Kuno, Cupertino, CA (US); Akhil Sahai, Santa Clara, CA (US); Yu Deng, Adelphi, MD (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2394 days.

(21) Appl. No.: 10/855,579

(22) Filed: May 27, 2004

(65) Prior Publication Data

US 2005/0268325 A1 Dec. 1, 2005

(51) Int. Cl.
*G06F 17/00* (2006.01)
*H04L 29/06* (2006.01)
(52) U.S. Cl. .......................................... 726/1; 713/153
(58) Field of Classification Search .................. None
See application file for complete search history.

(56) References Cited

U.S. PATENT DOCUMENTS

| 5,363,048 | A | | 11/1994 | Modlin et al. |
| 5,606,668 | A | * | 2/1997 | Shwed ............................ 726/13 |
| 5,704,040 | A | * | 12/1997 | Gunji .............................. 726/19 |
| 5,720,023 | A | * | 2/1998 | Putland et al. ................ 345/440 |
| 5,835,726 | A | * | 11/1998 | Shwed et al. ................. 709/229 |
| 5,873,066 | A | * | 2/1999 | Underwood et al. ............. 705/4 |
| 6,003,061 | A | * | 12/1999 | Jones et al. ................... 718/104 |
| 6,058,383 | A | | 5/2000 | Narasimhalu et al. |
| 6,434,624 | B1 | * | 8/2002 | Gai et al. ...................... 709/232 |
| 6,463,470 | B1 | * | 10/2002 | Mohaban et al. ............. 709/223 |

* cited by examiner

*Primary Examiner* — Kambiz Zand
*Assistant Examiner* — Dant Shaifer Harriman

(57) ABSTRACT

The disclosed embodiments relate to a system and method of applying policies. The method may include identifying a first entity and a first relationship, the first relationship defining an attribute related to the first entity. Additionally, the method may include identifying a policy associated with the first entity and the first relationship and applying semantics to determine a degree of relatedness between the first entity and a second entity. Further, the method may include applying the policy to a second relationship that defines an attribute related to the second entity if the degree of relatedness between the entity and the second entity is within a range of values.

13 Claims, 6 Drawing Sheets

METHOD AND SYSTEM FOR INTEGRATING POLICIES ACROSS SYSTEMS

BACKGROUND OF THE RELATED ART

Existing systems and methods for association of policies may associate policies directly with the entities to which they apply and on which they depend. In such systems, a policy may be defined as a set of rules that govern the behavior of the system. More specifically, a policy may be described as the entire set of strict (enforced) constraints, desirable directives, and actions that control the behavior of a target entity towards achieving a goal.

Entities are things or concepts (physical and/or conceptual objects) requiring representation in a system such as actors, roles, policies, views, and the like. Managed systems are considered as a set of related entities. In a managed system, each entity may be characterized by a set of attributes and the values associated with those attributes. Each entity may also be characterized by actions that are available to the management system to change the attribute values. Additionally, by describing the association between a management system and a policy, the policy may be further defined. Accordingly, policies may be defined as constraints that limit the values that the attributes may take in order for the entity (and the system composed from those entities) to behave within an acceptable range.

As an example of an existing system associating policies directly with the entities to which they apply and on which they depend, role/group-based systems are systems that can associate specific policies to roles/groups (e.g., allowing system access to an actor depending on the actor's assigned role or the actor's membership in a group). Accordingly, in this example, entities fall under the domain of policies according to explicit relationships. In a more specific example, a policy relating to permission to access a system entity may specify that access is to be granted to all members of a specific group.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

An open, adaptive enterprise must be able to rapidly incorporate new applications and services into a large existing enterprise infrastructure. However, an enterprise's numerous resources and information sources are often federated or "owned" by different entities. These sources and resources are also generally heterogeneous in that different domains may use their own data schemas, which may be proprietary or based on standards. Additionally, these sources and resources are generally in a constant state of evolution because the underlying data schemas change over time. Accordingly, an enterprise's numerous resources and information sources may be federated, heterogeneous, and constantly evolving. Thus, integrating and correlating relevant information relating to such enterprises presents significant challenges.

One of these challenges is how to manage and enforce policies across loosely-coupled distributed systems. Resources from disparate systems must be allocated, assigned, composed and managed uniformly. For example, policy constraints, and service level agreements must be interpreted in the context of data, messages, and events that originate from diverse information domains.

Accordingly, the present disclosure may relate to managing policies using a decentralized system that associates policies with entities based on the potentially complex, semantic relationships in which entities participate, rather than using a centralized system. Further, the present disclosure concerns the concept of indirect relationship (e.g., that a policy applies to resources linked using a given property relationship).

Figure 1:
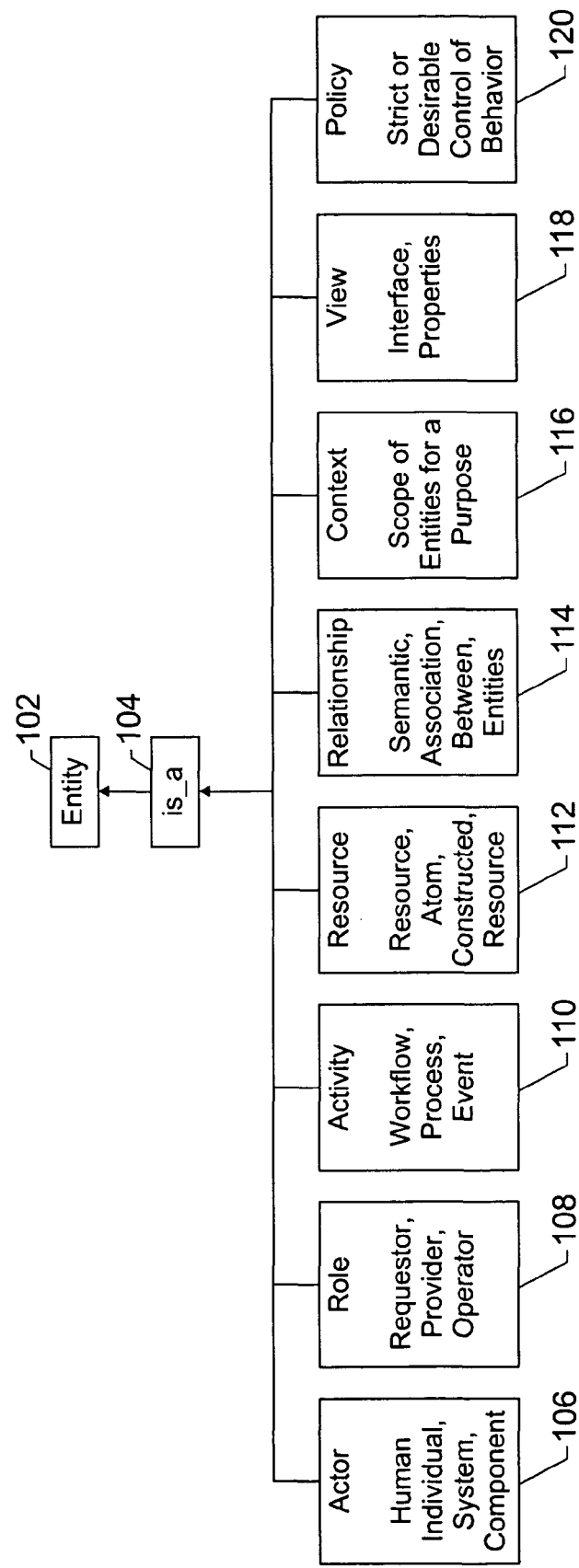
FIG. 1 is a block diagram representing an entity in accordance with embodiments of the present invention.

FIG. 1 is a block diagram representing an entity (block 102) in accordance with embodiments of the present invention. Entities are defined as things or concepts that require representation in a system. Accordingly, an entity may represent both physical and conceptual objects. For example, as illustrated by the "is_a" relationship (block 104) in FIG. 1, the entity (block 102) may be an actor (block 106) (e.g., a human individual, a system or a component), a role (block 108) (e.g., a requester, provider or operator), an activity (block 110) (e.g., a work flow process or an event), a resource (block 112) (e.g., a resource atom or constructed resource), a relationship (block 114) (e.g., semantic association between entities), a context (block 116) (e.g., a scope of entities for a purpose), a view (block 118) (e.g., interfaces or properties), or a policy (block 120) (e.g., strict or desirable control of behavior).

Various aspects of the present invention relate to Fault, Configuration, Accounting, Performance and Security (FCAPS) management. Further, these aspects may be modeled as constraints on system attributes and selection of actions that force the attribute values within certain ranges. Accordingly, several examples of this are given below.

Fault management may serve as a first example. Fault management may be viewed as a means of enforcing policies where the policies are constraints. One component of a fault management system may be fault detection or violations of some of the constraints that are set on attribute values of a system. Accordingly, fault management may be visualized as selection of corresponding actions taken to limit the fault detection or violations.

Turning to a second example, configuration management may be visualized as a means of enforcing policy. Specifically, configuration management may enforce a set of constraints or policies defined on the system so that the system may not be configured in a way that violates those constraints. When systems are constructed out of other systems, it is especially important to consider the constraints on the component systems.

Accounting management may be a third example. Accordingly, regarding accounting management, pricing policies may be modeled as constraints on various kinds of resources and how they are used. Based on these constraints, actions such as policing and flexing of resources may be taken as part of accounting management to enforce the pricing policies.

Performance management may be another example. In one embodiment, performance management may enforce policies associated with service level agreements (SLA). Accordingly, regarding performance management, SLA may be visualized essentially as constraints on the service level indicators (SLI) as defined in the corresponding service-level objectives (SLO). Performance management may thus be monitoring constraint violations and selecting actions that limit the frequency or severity of those violations.

Finally, security management may be an example. In security management, authorization, authentication obligations, and permissions may be modeled as constraints or policies that are enforced by security management. These constraints describe which actor can assume what roles, which roles may access what resources etc. Actions can then provide functions such as access control to resources.

In one embodiment of the presently disclosed method, policies may be associated with implicit, arbitrary, relationships. Furthermore, the semantics of these relationships may be dynamically specified, which means that the present method can programmatically identify which policies apply to which entities according to their context. Additionally, in some embodiments, the present method can integrate policy systems by mapping between relationships. Further, the present method may work with complex inferred relationships that are associated with sophisticated rule engines.

Figure 2:
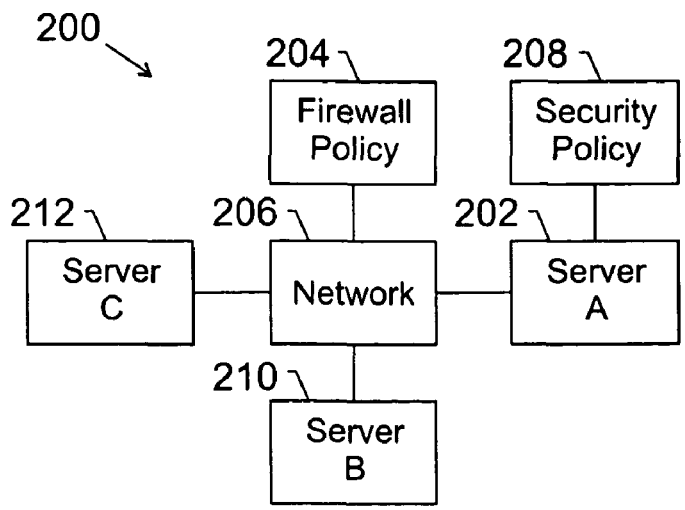
FIG. 2 is a block diagram illustrating a system in which embodiments of the present invention may be practiced.

FIG. 2 is a block diagram illustrating a system in which embodiments of the present invention may be practiced. The system is generally referred to by the reference numeral 200. Specifically, FIG. 2 illustrates an example wherein it is desirable to model that a certain machine, Server A (block 202) is associated with a policy (block 204) that any machine it connects to must be behind a corporate firewall. In a conventional system 200, this would be specified in a centralized way by associating a "all machines must be behind firewall" policy (block 204) with a specific network (block 206). And, by specifying, via an "only connect to secure network" policy (block 208), that Server A (block 202) can only be connected to networks that have a compatible "all machines must be behind firewall" policy (block 204).

Accordingly, there are two challenges with this approach. First, the "all machines behind firewall" (block 204) and "only connect to secure network" (block 208) policies must be correlated. Second, in order for this to work, machines must be modeled as connected to the network (block 206), not to each other. The policy is associated with the network (block 206) even though it is really imposed by only one particular machine (block 202). Accordingly, assuming Server A (block 202) is the only machine with the firewall policy (block 204), if it is deleted or the policy is dropped, the other machines, Server B (block 210) and Server C (block 212), connected to Server A (block 202) will no longer be subject to the firewall policy (block 204).

Figure 3:
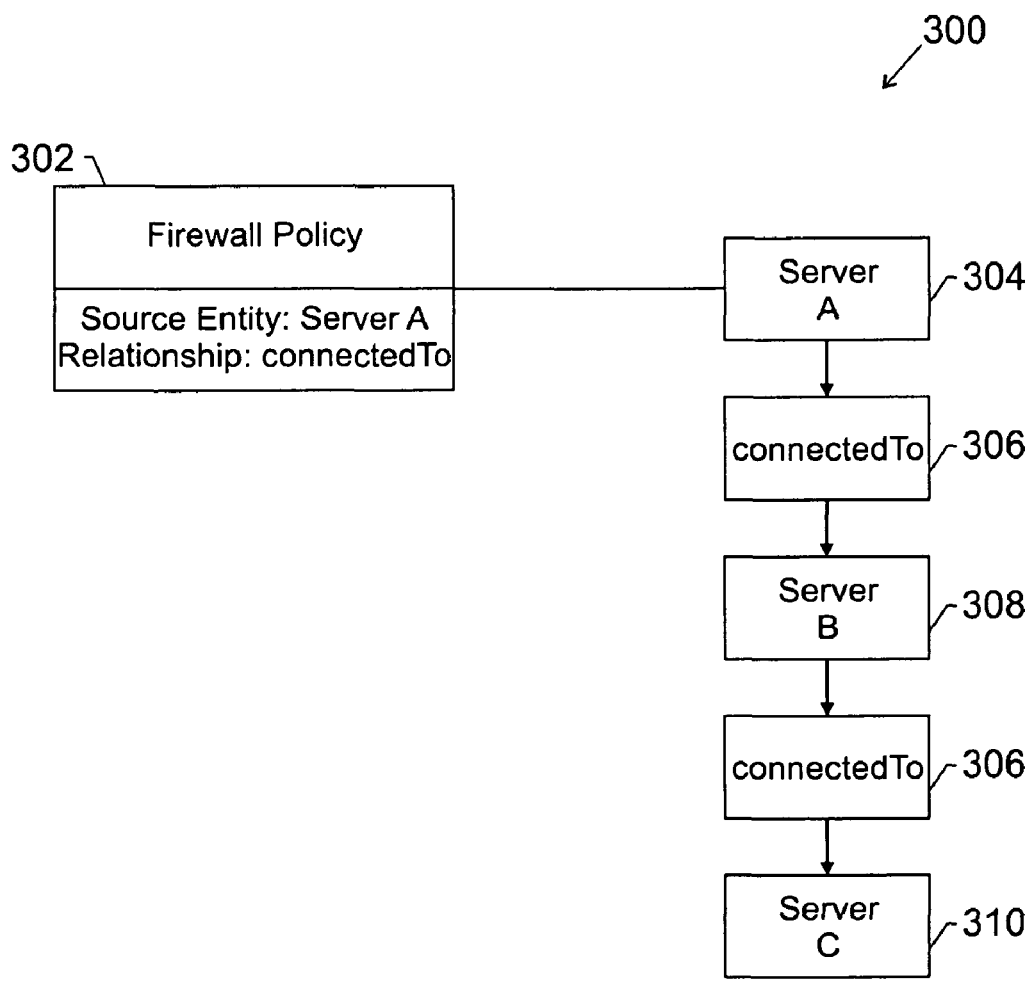
FIG. 3 is a block diagram illustrating an example system in accordance with embodiments of the present invention.

FIG. 3 is a block diagram illustrating an example system 300 in accordance with embodiments of the present invention. Specifically, FIG. 3 illustrates a system 300 where a policy (block 302) is associated with the system entity, Server A (block 304), and the relationship (block 306), "connectedTo." The present method offers a more loosely-coupled and flexible solution. For example, as shown in FIG. 3, an associative "connectedTo" relationship (block 306) may be created to model the network connections between machines such as Server B (block 308) and Server C (block 310). Additionally, a security policy (block 302) of "must be behind firewall" may then be created and associated with the "connectedTo" relationship (block 306) and Server A (block 304). Accordingly, because the "connectedTo" relationship (block 306) is associative, it may be inferred that any machine that is directly or indirectly associated with Server A (block 304) in a "connectedTo" relationship (block 306) is also subject to this policy (block 302).

Figure 4:
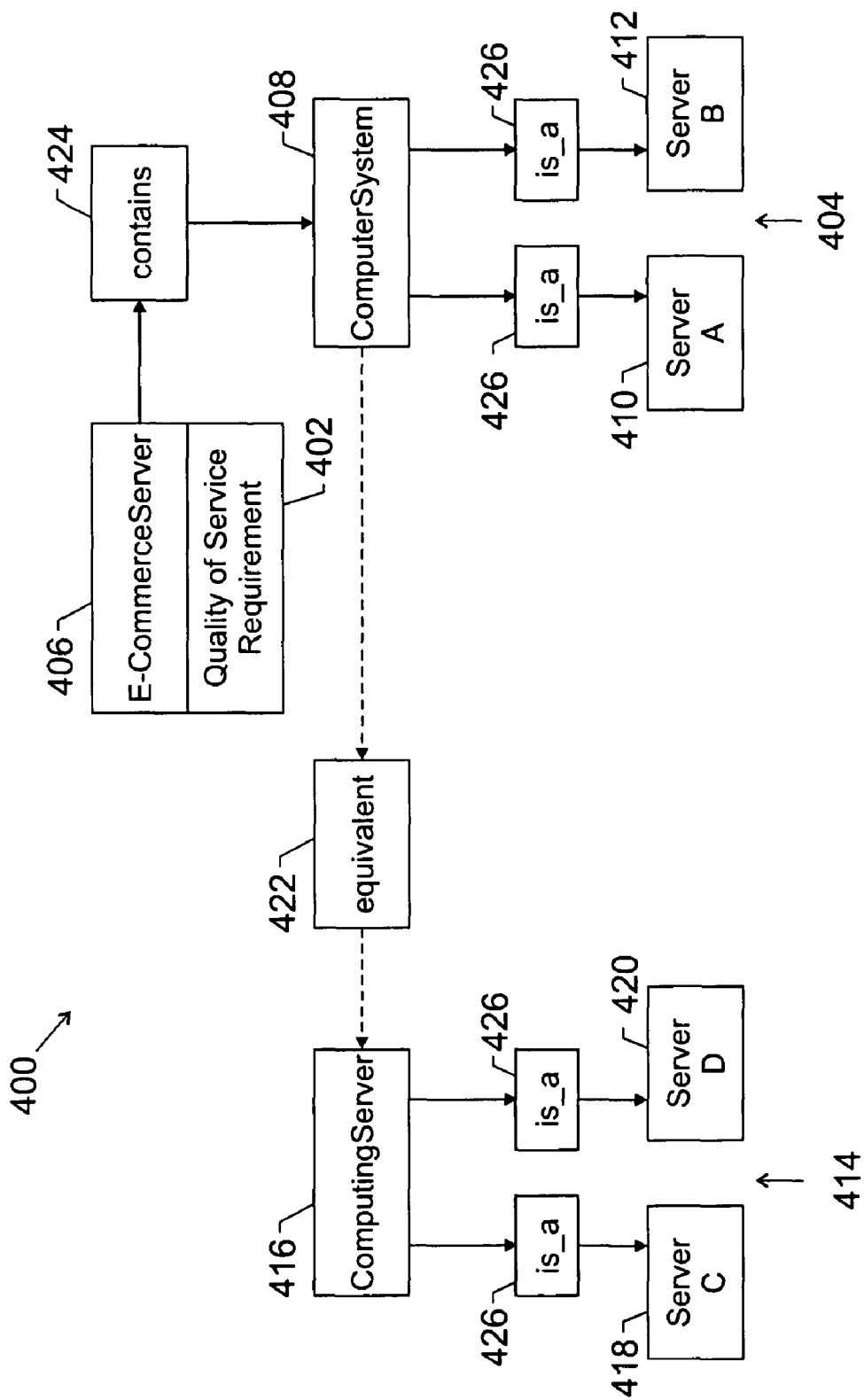
FIG. 4 is a block diagram illustrating an example system in accordance with embodiments of the present invention.

FIG. 4 is a block diagram illustrating an example system 400 in accordance with embodiments of the present invention. Specifically, FIG. 4 illustrates an example in which it is desirable to impose a Quality of Service requirement (block 402) upon the classes of machines 404. The classes of machines 404 are on the right side of FIG. 4, and can function as the server component (block 406) of an E-Commerce system. These machines 404 comprise: ComputerSystem (block 408), Server A (block 410), and Server B (block 412). FIG. 4 also illustrates that it may be desirable to integrate a new class of machines 414 from a different data model, such as ComputingServer (block 416) having subclasses Server C (block 418) and Server D (block 420), with this system 400. Further, FIG. 4 illustrates that a mapping may be defined between the two systems, using equivalence relationships (block 422), as shown in the figure.

In a conventional system, for example, the policy (block 402) specifying the Quality of Service requirement could be associated directly with the E-Commerce Server (block 406), but there would be no native support for inferring that the policy (block 402) also applies to Server D (block 420) because of the equivalence relationship that maps between them. In accordance with the present method, the policy could be associated with the E-Commerce Server (block 406) and the "contains" relationship (block 424). Assuming both the "contains" relationship (block 424) and the mapping are expressed as transitive relationships, the present system may automatically recognize that Server C (block 418), which relates to ComputingServer (block 416) through an "is_a" relationship (block 426), is also subject to the Quality of Service requirement (block 402).

In both of the cases presented in FIGS. 3 and 4, the present method can dynamically and programmatically identify which policies apply to which entities. Further, it should be noted that the present method can work with inferred relationships that are more complex due to more sophisticated rule systems.

The present system and method may provide a generic, flexible, mechanism that can be used to manage policies across a loosely-coupled distributed system. Because it is based upon relationships and is designed to exploit semantic information about these relationships in a generic manner, the present system and method is especially good for integrating entities and relationships from disparate sources. For example, if the system in FIG. 3 is integrated with another system (not shown), and an equivalence relationship such as the one in block 420 is specified between the "connectedTo" relationship (block 306) and another relationship, such as "composed-of" (not shown), the present method may automatically recognize that the security policy (block 302) also applies to entities in a "composed-of" relationship (not shown) with the server (block 304).

Figure 5:
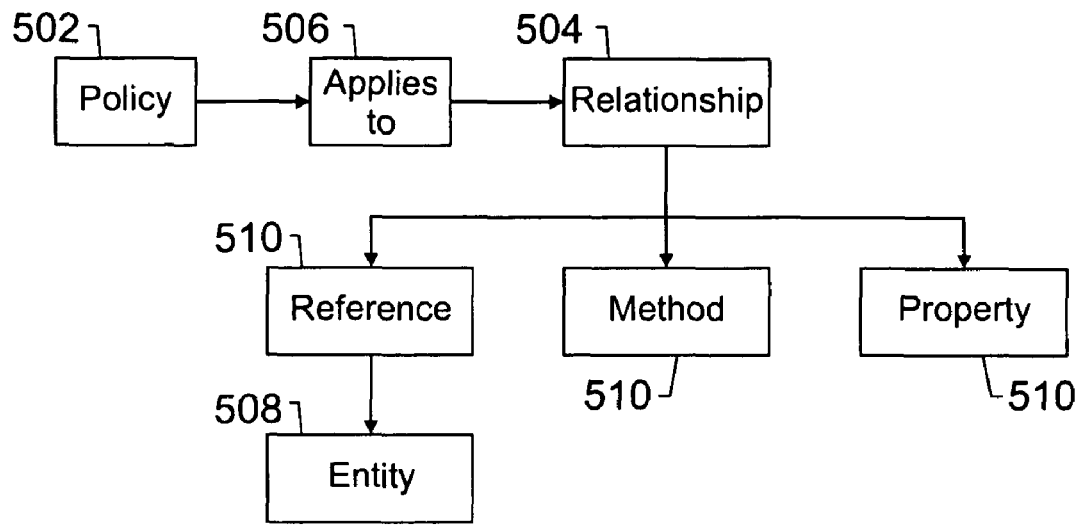
FIGS. 5 and 6 are block diagrams representing two alternative methods of associating policies with relationships in accordance with embodiments of the present invention.
Figure 6:
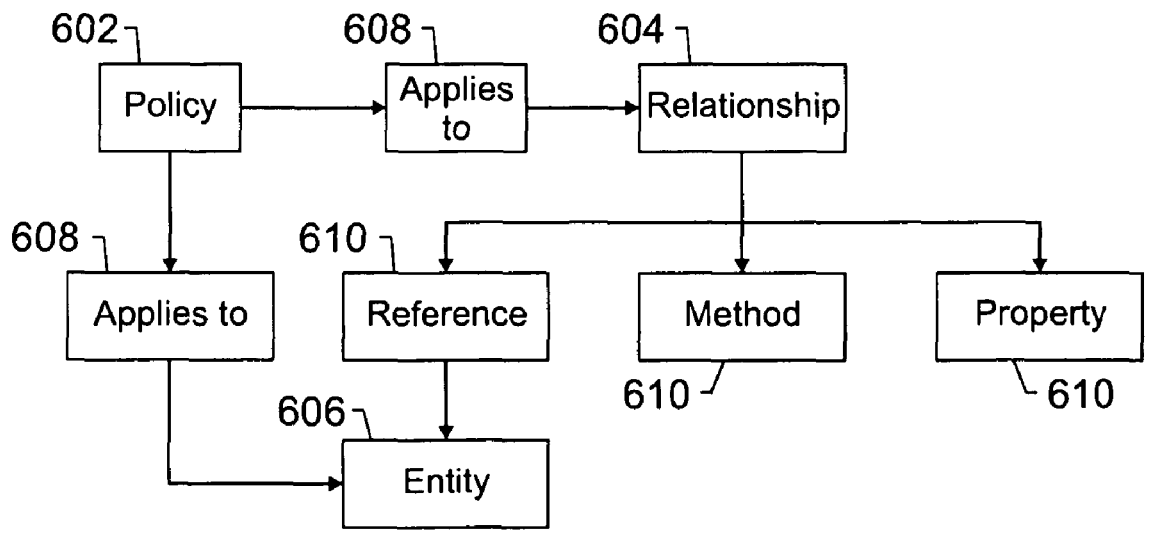

FIGS. 5 and 6 are block diagrams representing two alternative methods of associating policies with relationships in accordance with embodiments of the present invention. The first alternative (shown in FIG. 5) associates policies (block 502) directly with relationships (block 504) through an "applies to" relationship (block 506). As shown in the figure, a policy (block 502) applies to a relationship (block 504), which links entities (block 508). Because relationships are modeled here as first-class system entities, a relationship can have other states (block 510) associated with it, such as methods or properties, as shown in the figure.

Accordingly, once a policy (block 502) has been associated with a relationship (block 504), then any instances of that relationship (block 504) associating specific entities are subject to that policy (block 502). For example, suppose that there were a policy attached to a composition relationship between a system and its components that the price of a single component cannot exceed fifty-percent of the cost of the total system. The policy would then apply to all instances of the composition relationship. For example, if a new instance of composition relationship were created, linking two entities using the composition relationship, then the policy would be applied.

FIG. 6 is a block diagram illustrating policies (block 602) linked to both relationships (block 604) and entities (block 606) through an "applies to" relationship (block 608). Additionally, states (block 610) are illustrated that may be associated with a relationship such as the one illustrated by block 608. Accordingly, in this second alternative, policies (block 602) are applied to both relationships (block 604) and specific entities (block 606). Further, combined with the semantics of the relationship (block 604), this alternative allows different policies (block 602) to apply to different instances of relationships.

For example, if there were an associative "connectedTo" relationship, a specific security policy (e.g., "must be completely insulated by the firewall") might be associated with every system that is on the same network as a given server. Accordingly, by associating policies with relationships, and by applying certain semantics to the relationships, policies may be associated with entities based on inferred relationships. Thus, it can be determined whether or not the specific security policy applies to any entity in the system at a given time by dynamically identifying the entity's current relationships to other entities. For example, in reference to FIG. 3, the "must be completely insulated by the firewall" policy (block 302) is associated with server A (block 304) and the "connectedTo" relationship (block 306). Additionally, server A (block 304) is connected to server B (block 308), which is in turn connected to server C (block 310). Accordingly, the current method is capable of inferring that machine C (block 310) is subject to the policy (block 302) and must be completely insulated by the firewall.

Figure 7:
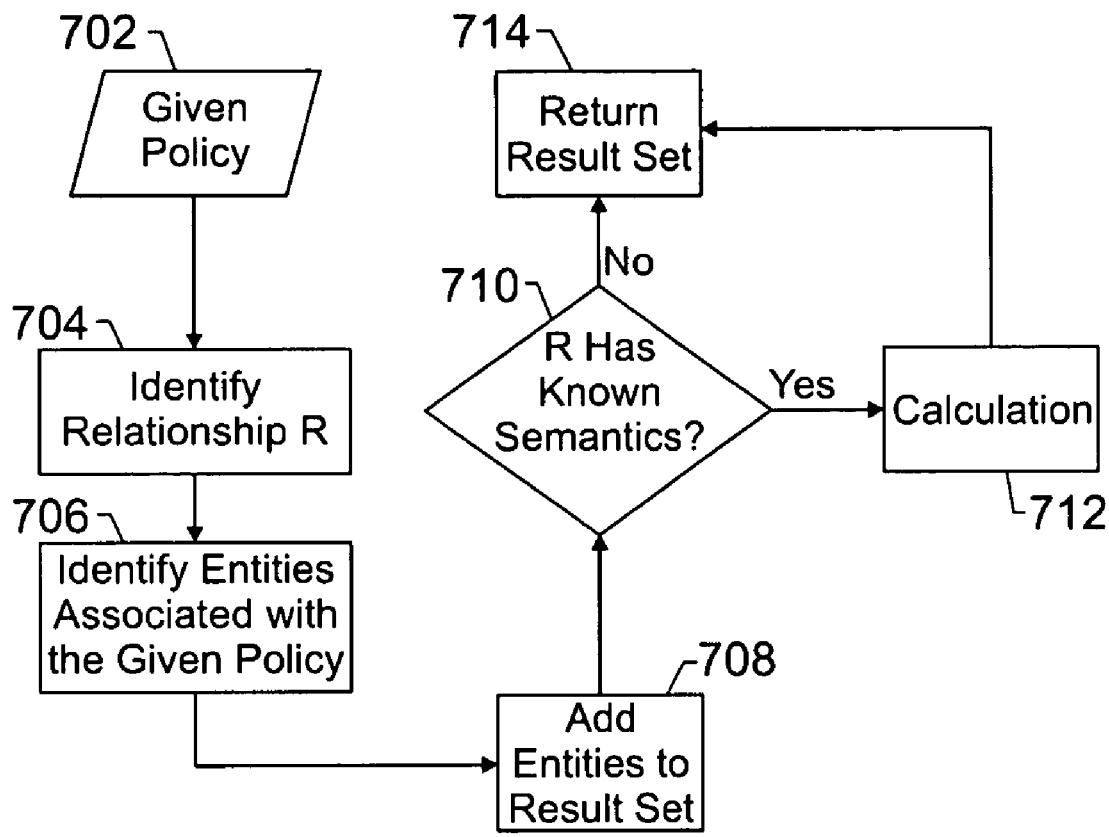
FIG. 7 is a block diagram illustrating a method in accordance with embodiments of the present invention.

FIG. 7 is a block diagram illustrating a method in accordance with embodiments of the present invention. Specifically, FIG. 7 illustrates a method of determining which entities are subject to a given policy when policies are associated with entities and relationships. Accordingly, each block in FIG. 7 represents a certain act or step in the method. Block 702 represents a given policy, PolicyObject. Block 704 represents identification of the given policy's relationship, R. Block 706 represents identifying a set of entities associated with the policy, EntityObjects S1 . . . Sn. Block 708 represents the addition of the set of entities S1 . . . Sn to a result set. Block 710 is a decision block for determining whether R has known semantics. If R has known semantics, EntityObjects in indirect relationship to entity S via relationship R are calculated for each entity S in S1 . . . Sn and added to the result set in calculation block 712. Then, the result set is returned (block 714). Alternatively, if relationship R has no known semantics, block 712 is bypassed and the result set is returned (block 714).

Figure 8:
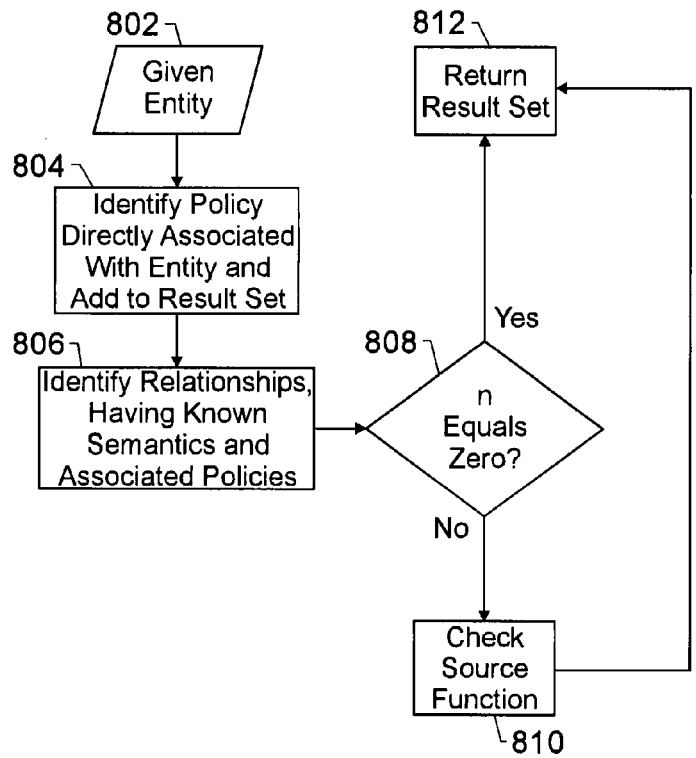
FIG. 8 is a block diagram illustrating a method in accordance with embodiments of the present invention.

FIG. 8 is a block diagram illustrating a method in accordance with embodiments of the present invention. Specifically, FIG. 8 is a block diagram of a system and method of identifying polices that apply to a given entity when policies are associated with entities and relationships. Accordingly, each block in FIG. 8 represents a certain act or step in the method. Block 802 represents a given entity, source entity object. Block 804 represents identifying policy objects that are directly associated with the source entity object and adding them to a result set. Block 806 represents identifying the source entity object's relationships, R1 . . . Rn, having known semantics and one or more associated policies, P1 . . . Pm. Block 808 is a decision block for determining whether the value of n is equal to zero (n=0). If n is not equal to zero (i.e., there exists more than one relationship, R1), the method proceeds to a check source function illustrated by block 810. In block 810, for each policy, Pi, $1<I \leq m$, associated with relationship Ri, $1<j \leq n$, it is determined whether Pi's source is associated with the source entity object via relationship, Rj, either directly or indirectly. Additionally, if such as association exists, Pi is added to the result set (block 810). Next, the result set is returned (block 812). Alternatively, if n is equal to zero (i.e., there exists only one relationship, R1), block 810 is bypassed and the result set is returned 812.

Figure 9:
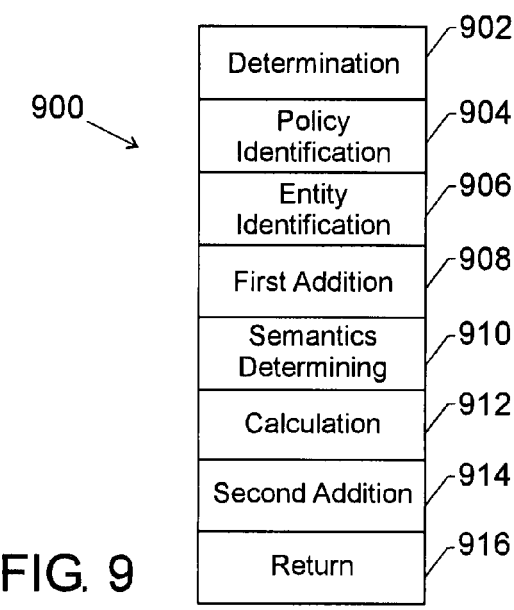
FIG. 9 is a block diagram illustrating a computer system in accordance with embodiments of the present invention.

FIG. 9 is a block diagram illustrating a computer system 900 in accordance with embodiments of the present invention. Specifically, FIG. 9 illustrates a computer system 900 for applying policies. The computer system 900 may incorporate various modules, as is illustrated by FIG. 9. While FIG. 9 separately delineates specific modules, in other embodiments, individual modules may be split into multiple modules or combined into a single module. Further, individual modules and components may be hardware, software or some combination of both. In particular, the modules illustrated by FIG. 9 include: a determination module 902, a policy identification module 904, an entity identification module 906, a first addition module 908, a semantics determining module 910, a calculation module 912, a second addition module 914, and a return module 916.

The determination module 902 may be for determining whether an entity is subject to a policy, the policy being associated with at least one entity and at least one relationship. The policy identification module 904 may be for identifying the policy of a given relationship. The entity identification module 906 may be for identifying a set of entities associated with the policy. The first addition module 908 may be for adding the identified set of entities to a result set. The semantics determining module 910 may be for determining whether the relationship has semantics. The calculation module 912 may be for calculating other entities in indirect association with the set of entities via the relationship for each entity in the set of entities where known semantics are present. The second addition module 914 may be for adding the calculated other entities to the result set. Finally, the return module 916 may be for returning a final result set.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A processor-based method of applying a policy with a system, comprising:
   operating one or more processors to implement software modules of the system, wherein implementing comprises:
   identifying a first entity and a first relationship, the first relationship defining an attribute related to the first entity;
   identifying a policy associated with the first entity and the first relationship;
   applying semantics to determine a degree of relatedness between the first entity and a second entity; and
   applying the policy to a second relationship that defines an attribute related to the second entity if the degree of relatedness between the first entity and the second entity is within a specific range of values, wherein the first and second entities are network components.

2. The method of claim 1, comprising defining the policy as a security policy for a server on a network.

3. The method of claim 1, comprising associating a plurality of policies with a plurality of entities and a plurality of relationships.

4. The method of claim 1, comprising returning a result set.

5. The method of claim 1, comprising defining the policy as a quality of service policy including a metric relating to quality of service.

6. The method of claim 1, comprising defining the first entity and the second entity as computers.

7. The method of claim 1, comprising defining the first entity and the second entity as components of a network.

8. A processor-based method of applying policies with a system, comprising:
   operating one or more processors to implement software modules of the system,
      wherein implementing comprises:
      determining whether an entity is subject to a policy, the policy being associated with the entity and at least one relationship;
      identifying the policy associated with the at least one relationship;
      identifying a set of entities associated with the policy;
      adding the identified set of entities to a result set;
      determining whether the relationship has semantics;
      if semantics are present, adding to the result set a different entity that is caused by the relationship to be in indirect association with the set of entities; and
      if no semantics are present, returning a final result set, wherein the entity and the different entity are computers.

9. A processor-based method of applying policies with a system, comprising:
   operating one or more processors to implement software modules of the system,
      wherein implementing comprises:
      determining whether an entity is subject to a policy, the policy being associated with the entity and at least one relationship;
      identifying the policy associated with the at least one relationship;
      identifying a set of entities associated with the policy;
      adding the identified set of entities to a result set;
      determining whether the relationship has semantics;
      if semantics are present, adding to the result set a different entity that is caused by the relationship to be in indirect association with the set of entities; and
      if no semantics are present, returning a final result set, wherein the entity and the different entity are components of a network.

10. A processor-based method of identifying policies by operating one or more processors to implement software modules, comprising:
    identifying a policy that applies to network components, the policy being associated with at least one network component and at least one relationship;
    identifying a source network component and a policy object that is directly associated with the source network component;
    adding the identified policy object to a result set;
    identifying at least one relationship of the source network component having semantics and at least one associated policy;
    determining whether more than one relationship is present;
    where more than one relationship is present, determining whether a policy source is associated with the source network component and adding the policy source to the result set where the policy source is associated with the source entity object; and
    displaying the result set.

11. The method of claim 10, comprising defining the policy as a security policy for a server on a network.

12. The method of claim 10, comprising defining the policy as a quality of service policy including a metric relating to quality of service.

13. A computer system, comprising:
    a memory storing software modules configured to:
       identify a first entity and a first relationship, the first relationship defining an attribute related to the first entity;
       identify a policy associated with the first entity and the first relationship;
       apply semantics to determine a degree of relatedness between the first entity and a second entity; and
       apply the policy to a second relationship that defines an attribute related to the second entity if the degree of relatedness between the first entity and the second entity is within a specific range of values, wherein the first and second entities are network components or computers; and
    a processor configured to implement the software modules.

* * * * *